United States Patent Office 3,189,522
Patented June 15, 1965

3,189,522
ANTI-HYPERCHOLESTEROL STEROIDS
Edward W. Cantrall, Pearl River, Seymour Bernstein, New City, and Walter P. Cekleniak, Pearl River, N.Y., assignors to American Cyanamid Company, Stamford, Conn., a corporation of Maine
No Drawing. Filed July 17, 1962, Ser. No. 210,569
17 Claims. (Cl. 167—65)

This invention relates to methods of and compositions for lowering cholesterol content of the blood in warm blooded animals.

In the prior art, many references are made to the undesirable effects which may take place in the circulatory system when the cholesterol content is substantially above normal. When the cholesterol content is abnormally high for longer periods of time, it may materially aid in constricting blood vessels to the point of disrupting blood flow with its consequent danger to life itself. While there are differences of opinion as to the causes of high blood cholesterol, most agree that lowering blood cholesterol is desirable when it is unusually high.

We have now found that compositions containing as an active ingredient a steroid of the following formula, are unique in being useful in lowering the cholesterol content of the blood with little if any feminizing properties:

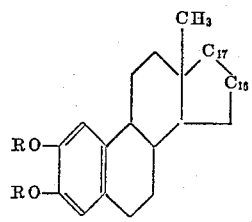

in which R is selected from the group consisting of hydrogen, lower alkyl, lower alkanoyl and aroyl groups, $C_{16}$ and $C_{17}$ are selected from the group consisting of methylene, carbonyl, hydroxymethylene, and lower alkanoyloxymethylene groups.

Typical steroids applicable for use in the present invention are:

2-hydroxy-estrone;
2-hydroxy-estrone-3-methyl ether;
2-hydroxy-estrone-2,3-diacetate;
2-methoxy-estrone;
2-methoxy-estrone-3-benzoate;
2-methoxy-estrone-3-methyl ether;
2-hydroxy-estradiol-17$\beta$;
2-hydroxy-estradiol-17$\beta$,17-acetate;
2-hydroxy-estradiol-17$\beta$-2,3-diacetate;
2-methoxy-estradiol-17$\beta$;
2-methoxy-estradiol-17$\beta$,17-acetate;
2-methoxy-estradiol-17$\beta$,3-benzoate;
2-hydroxy-estradiol-17$\beta$ 3,17-diacetate;
2-hydroxy-estradiol-17$\beta$ 3-methyl ether 17-acetate;
2-hydroxy-estradiol-17$\beta$ 3-methyl ether;
2-methoxy-estradiol-17$\beta$ 3-methyl ether 17-acetate;
2-methoxy-estradiol-17$\beta$ 3-methyl ether;
2-hydroxy-estriol;
2-hydroxy-estriol 16,17-diacetate;
2-methoxy-estriol;
2-hydroxy-estriol 3-methyl ether 16,17-diacetate;
2-hydroxy-estriol 3-methyl ether; and
2-methoxy-estriol 3-methyl ether.

The above compounds are described in the prior art and many will be found in the following references: J. Am. Chem. Soc., 80, 1213 (1959); J. Am. Chem. Soc., 81, 1702 (1959); Chem. and Industry, 1454 (1959); and J. Org. Chem., 25, 585 (1960).

O$_8$2OOO

The steroid compounds of this invention have shown anticholesteremic activity approximately equal to or greater than that of [p-($\beta$-diethylaminoethoxy)phenyl]-1-(p-tolyl)-2-(p-chlorophenyl)ethanol. Tests comparing a product of this invention with the latter and estrone were carried out as follows.

Groups of four male rats were put on a standard diet of ground rat pellets. A control group is maintained on the ground rat pellets only, and test groups on the ground pellets in which different concentrations of compound to be tested is incorporated. After six days the animals are sacrificed, and serum cholesterol is determined according to the saponification and extraction method described by Trinder, P., Analyst, 77, 321 (1952), and the colormetric determination of Zlatkis et al., J. Lab. Clin. Med., 44, 486 (1953). Results compared to control are summarized in the table below.

TABLE I

| Percent in diet | Percent cholesterol of control | | |
|---|---|---|---|
| | 2-methoxy-estrone | Estrone | [p-($\beta$-diethylaminoethoxy) phenyl]-1-(p-tolyl)-2-(p-Chlorophenyl) ethanol |
| 0.001 | 91 | 79 | 86 |
| 0.003 | 74 | 57 | 72 |
| 0.005 | | | 65 |
| 0.01 | 59 | 33 | |
| 0.03 | 49 | | |

The steroids described above are dispensed as the active ingredient in compositions of the steroid and an edible carrier. While the amount of steroid to be given daily will depend on many factors such as size, weight, age etc. of the warm blooded animal, it has been found that a daily intake of from 5 mg. to 50 mg. will produce good results. The dosage unit may be in a form for a single unit per day, or smaller forms for use as multiple units per day. In the case of tablets, they may be of larger size, scored for use as fractional units one or more times per day.

The compositions can be dispensed in the form of soft or hard shell gelatin capsules. Also present in the capsules may be diluents such as lactose, starch, magnesium oxide, magnesium stearate and the like. The capsules may be large enough to provide the desirable daily dosage or smaller to be used in multiple doses per day.

The present compositions may be dispensed as parenteral solutions or suspensions. If larger doses in small amounts are desirable it may be necessary to use parenteral suspensions because the solubility of the steroids in substantially aqueous solutions is limited.

The compositions of the present invention may take the form of syrups or pediatric drops. Such formulations usually contain one or more of the following suspending agents, buffer salts, stabilizers, preservatives, etc. The use of these is described in the examples hereinafter.

*Example I*

The compounds of the present invention can be given parenterally in the form of parenteral suspensions such as the following.

| | Percent w./v. |
|---|---|
| 2-methoxy-estrone (micronized) | 0.5–5, 1.5–5.0 |
| Polysorbitan 80 | 0.1–0.2 |
| Polyethylene glycol 4000 | 2.0–5.0 |
| Sodium chloride USP | 0.5–0.8 |
| Benzyl alcohol | 0.9 |
| Pyrogen-free distilled water to make | 100.0 |

The above suspension has a pH of about 6. Obviously, other ingredients can be used in place of the above to prepare desired suspensions. For example, as surfactants in place of polysorbitan 80 we can use ethylene oxide of polyoxypropylene base and so forth. Other suspending agents such as carboxymethylcellulose, methyl cellulose and gelatin can be used. Other salts than sodium chloride can be used such as sodium phosphates. While benzyl alcohol is a desirable preservative, others can be used such as parabens, chlorobutanol etc. Also, in place of polyethylene glycol 4000 other vehicles can be used such as polyethylene glycol 400.

Example II

The compounds of the present invention can be administered in oral preparations in the form of syrup or pediatric drops depending on the intended use. The following formulation can be used for this purpose.

| | Percent w./v. |
|---|---|
| 2-methoxy-estrone | 0.25–25 |
| Complex coloidal magnesium aluminum silicate | 6.0–10.0 |
| Sodium phosphate monobasic | 0.07 |
| Sodium phosphate dibasic | 0.02 |
| Methyl parabens | 0.08 |
| Propyl parabens | 0.02 |
| Sucrose | 10–30 |
| Red dye FDC #2 | 0.003 |
| Cherry flavor | 0.06 |
| Distilled water | 25–60 |
| Sorbitol solution to make | 60–100.0 |

The above syrup or pediatric drops has a pH of about 6.0. In formulating syrup or pediatric drops various agents can be used in place of these shown in the above formulation. For example, suspending agents such as Veegum magma (complex colloidal magnesium-aluminum silicate) can be replaced with bentonite magma, tragacanth, carboxymethylcellulose, methylcellulose, carbopol 934 (carboxy vinyl polymer of high molecular weight), etc. The phosphates used as buffers in the above formulation can be replaced with citrates or tartrates. In place of preservatives such as parabens others can be used such as alkali metal benzoates, sorbic acid, etc. Also in the above formulation, the sugar and sorbitol can be replaced as a whole or in part with corn syrup, glycerol, invert sugars, etc. Also, the adjuvants such as dyes and flavors can be replaced in whole or in part with sequestrene, bisulfites, etc.

Example III

The present compounds can be dispensed in dosage unit forms such as hard shell capsules or soft shell capsules. A formation found useful in the preparation of such capsules is as follows.

| | Per 100 capsules, grams |
|---|---|
| 2-methoxy-estrone | 12.50 |
| Lactose, USP | 12.50 |
| Magnesium stearate (0.5%) | 0.125 |
| Total | 12.125 |

The above formulation is thoroughly mixed and placed as equal quantities in 100 capsules.

Example IV

The following example represents a formulation useful in preparing tablets or oblets. These tablets can be prepared with sufficient active ingredient for one-half day's use or about 10 mg. Larger tablets can be scored and divided into halves or quantities to be given one to four times a day. Obviously also smaller tablets can be used in multiple doses to obtain the daily amount of active material. The following formulation has been found useful.

| | Per tablet, mg. |
|---|---|
| 2-methoxy-estrone | 10 |
| Corn starch | 30 |
| Lactose | 100 |
| Methylcellulose 400 | 5 |
| Magnesium stearate 1% | 2.6 |
| Total | 25.125 |

The above tablet contains 10 mg. of steroid and would usually be given one to four times a day to obtain the maximum amount of desired compound per day.

Example V

The various compounds of the present invention can also be given in the form of tablets containing other ingredients as follows.

| | Per tablet, grams |
|---|---|
| 2-methoxy-estrone | 0.05 |
| Corn starch | 0.30 |
| Ethylecellulose N 10 | 0.005 |
| Magnesium stearate 1% | 0.0016 |
| Total | 0.3566 |

The above formulation can be varied by increasing or decreasing the corn starch and by the addition of other ingredients. Also in place of corn starch other disintegrating agents can be used such as potato startch. Other lubricants such as stearic acid, talc and the like can be used. Sweetening agents such as saccharin or sodium cyclohexyl sulfamate and flavoring such as peppermint oil, oil of wintergreen, orange or cherry can be used.

Example VI

The compounds of the present invention can be given intramuscularly in the form of the following formulation:

| | | |
|---|---|---|
| 2-methoxy-estrone | mg./ml. | 10 |
| Benzyl alcohol | percent | 0.9 |
| Cotton seed oil to make 1 ml. | | |

Example VII

The compounds of the present invention can be given intramuscularly or subcutaneously in the form of the following formulation:

| | | |
|---|---|---|
| 2-methoxy-estrone | mg./ml. | 20 |
| Sodium carboxymethylcellulose | percent | 0.4 |
| Tween 80 | do | 0.1 |
| Benzyl alcohol | do | 0.9 |
| Isotonic saline to make 2 ml. | | |

Example VIII

The compounds of the present invention can be given intramuscularly or subcutaneously in the form of the following formulation:

| | | |
|---|---|---|
| 2-methoxy-estrone | mg./ml. | 50 |
| Sodium carboxymethylcellulose | mg. | 10 |
| Sodium chloride | mg. | 9 |
| Tween 80 | mg. | 1 |
| Benzyl alcohol | mg. | 9 |
| Sterile water to make 50 ml. | | |

We claim:
1. A method for treating hypercholesteremia in warm-blooded animals which comprises administering to said animals a composition containing as an essential active ingredient a compound of the formula:

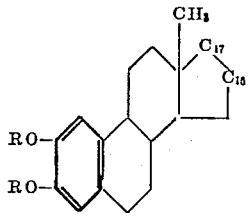

in which R is selected from the group constisting of hydrogen, lower alkyl, lower alkanoyl and benzoyl, $C_{16}$ and $C_{17}$ are selected from the group consisting of methylene, carbonyl, hydroxymethylene and lower alkanoyloxymethylene, said administration being in an amount sufficient to lower blood cholesterol content.

2. A method according to claim 1 in which the active ingredient is 2-methoxy-estrone.

3. A method according to claim 1 in which the active ingredient is 2-hydroxy-estrone.

4. A method according to claim 1 in which the active ingredient is 2-methoxy-estradiol-17β.

5. A method according to claim 1 in which the active ingredient is 2-hydroxy-estradiol-17β.

6. A method according to claim 1 in which the active ingredient is 2-methoxy-estriol.

7. A method according to claim 1 in which the active ingredient is 2-hydroxy-estriol.

8. A method according to claim 1 in which the active ingredient is administered in an amount of 5–50 mg. per day.

9. A method of lowering blood cholesterol in warm blooded animals which comprises administering to said animals a composition containing 2-methoxy-estrone in an amount of 5–50 mg. per day and a pharmaceutical carrier.

10. A method of lowering blood cholesterol in warm blooded animals which comprises administering to said animals a composition containing 2-methoxy-estradiol in an amount of 5–50 mg. per day and a pharmaceutical carrier.

11. A composition of matter adapted for treating hypercholesteremia in warm-blooded animals containing as an essential active ingredient a steroid having the following formula:

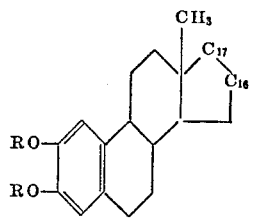

in which R is selected from the group consisting of hydrogen, lower alkyl, lower alkanoyl and benzoyl, $C_{16}$ and $C_{17}$ are selected from the group consisting of methylene, carbonyl, hydroxymethylene and lower alkanoyloxymethylene, said active ingredient being present in amounts varying from 5 to 50 mg. in conjunction with a pharmaceutical carrier that is chemically inert with respect to said active ingredient and being in dosage unit form.

12. A composition of matter as defined in claim 11 in which the steroid is 2-methoxy-estrone.

13. A composition of matter as defined in claim 11 in which the steroid is 2-hydroxy-estrone.

14. A composition of matter as defined in claim 11 in which the steroid is 2-methoxy-estradiol-17β.

15. A composition of matter as defined in claim 11 in which the steroid is 2-hydroxy-estradiol-17β.

16. A composition of matter as defined in claim 11 in which the steroid is 2-methoxy-estriol.

17. A composition of matter as defined in claim 11 in which the steroid is 2-hydroxy-estriol.

References Cited by the Examiner

Axelrod: Chem. Abst., vol. 54, 1960, pp. 13452–13453.
Barr: Assn. of Am. Physicians Transactions, vol. 65, 1952, pp. 110–111.
Fishman: Chem. Abst., vol. 52, 1958, pp. 13765–13766.
Hormone: Brit. Med. Jour., Mar. 1, 1958, p. 509.
Kraychy: Chem. Abst., vol. 53, 1959, pp. 17182–17183.
Myansikov: Chem. Abst., vol. 49, 1955, p. 5646(f).

JULIAN S. LEVITT, *Primary Examiner.*

MORRIS O. WOLK, *Examiner.*

UNITED STATES PATENT OFFICE
CERTIFICATE OF CORRECTION

Patent No. 3,189,522                                             June 15, 1965

Edward W. Cantrall et al.

It is hereby certified that error appears in the above numbered patent requiring correction and that the said Letters Patent should read as corrected below.

Column 2, line 3, for "(1959)" read -- (1958) --; line 6, strike out "$0_8 2000$"; column 4, line 18, for "25.125" read -- 147.6 --.

Signed and sealed this 16th day of November 1965.

(SEAL)
Attest:

ERNEST W. SWIDER
Attesting Officer

EDWARD J. BRENNER
Commissioner of Patents